(12) United States Patent
Shim et al.

(10) Patent No.: US 9,617,456 B2
(45) Date of Patent: Apr. 11, 2017

(54) METHOD OF MANUFACTURING CERAMIC COATED GRAPHITE

(71) Applicant: WAPS Co., Ltd., Busan (KR)

(72) Inventors: Sang Eun Shim, Incheon (KR); Seong Cheol Choi, Busan (KR); Min Jae Kim, Incheon (KR); Yeongseon Kim, Incheon (KR)

(73) Assignee: WAPS CO., LTD., Busan (KR)

( * ) Notice: Subject to any disclaimer, the term of this patent is extended or adjusted under 35 U.S.C. 154(b) by 143 days.

(21) Appl. No.: 14/445,084

(22) Filed: Jul. 29, 2014

(65) Prior Publication Data

US 2015/0034857 A1    Feb. 5, 2015

(30) Foreign Application Priority Data

Aug. 1, 2013    (KR) .................. 10-2013-0091527
Jun. 16, 2014   (KR) .................. 10-2014-0072934

(51) Int. Cl.

| | | |
|---|---|---|
| H01B 1/04 | (2006.01) | |
| C01B 31/02 | (2006.01) | |
| C01B 13/02 | (2006.01) | |
| C09K 5/14 | (2006.01) | |
| C04B 33/00 | (2006.01) | |
| C01B 31/04 | (2006.01) | |
| C08K 3/04 | (2006.01) | |
| C08K 9/02 | (2006.01) | |

(52) U.S. Cl.
CPC ............... *C09K 5/14* (2013.01); *C01B 31/04* (2013.01); *C04B 33/00* (2013.01); *C08K 3/04* (2013.01); *C08K 9/02* (2013.01); *C08K 2201/016* (2013.01)

(58) Field of Classification Search
CPC .. C01B 31/02–31/04; H01B 1/02–1/04; C04B 33/00
USPC ....... 252/500–519.1; 423/445 R–448, 445 B; 977/890
See application file for complete search history.

(56) References Cited

U.S. PATENT DOCUMENTS

2003/0211724 A1    11/2003 Haase
2010/0221531 A1    9/2010 Oh et al.
(Continued)

FOREIGN PATENT DOCUMENTS

| KR | 10-0895521 | 4/2009 |
| WO | WO 2004/052559 A3 | 6/2004 |

OTHER PUBLICATIONS

Fujigaya ("Methodology for Homogeneous Dispersion of Single-walled Carbon Nanotubes by Physical Modification." Polymer J, 40, pp. 577-589, 2008).*

(Continued)

*Primary Examiner* — Tri V Nguyen
(74) *Attorney, Agent, or Firm* — Revolution IP, PLLC

(57) ABSTRACT

Disclosed is a method of manufacturing ceramic coated graphite having electric resistance in a range from $10^8$ to $10^{16}$ Ω/sq via a sol-gel method, the ceramic coated graphite comprising graphite; and ceramic chemically bonded to a lateral defect area of the graphite, wherein the graphite is oval graphite having an aspect ratio selected from the group consisting of 10:1 to 200:1, and the ceramic is at least one type selected from the group consisting of magnesium oxide, aluminum oxide, zinc oxide, zirconium oxide, and silica.

6 Claims, 2 Drawing Sheets

(56) References Cited

U.S. PATENT DOCUMENTS

2012/0104329 A1* 5/2012 Meyer .................. C08F 293/005
                                                       252/511
2012/0326093 A1* 12/2012 Landorf ................. B82Y 30/00
                                                       252/500
2015/0291429 A1* 10/2015 Ge ......................... B82Y 30/00
                                                       494/37

OTHER PUBLICATIONS

Choi ("PVP-assistedsynthesisofdensesilica-coatedgraphitewithelectrically insulating property." Material Let, 90, pp. 87-89, online Sep. 16, 2012).*

Yang ("Effects of modification on performance of natural graphite coated by SiO2 for anode of lithium ion batteries." Trans Nonferrous Metals Soc of China, 17, pp. 1339-1342, 2007).*

Colchester ("Laser-generated ultrasound with optical fibres using functionalised carbon nanotube composite coatings." App Phys Let, 104, 173502, online Apr. 29, 2014).*

Wei ("Controlled assembly of protein-protected gold nanoparticles on noncovalent functionalized carbon nanotubes." Carbon, 48, pp. 645-653, pub Oct. 9, 2009).*

* cited by examiner

METHOD OF MANUFACTURING CERAMIC COATED GRAPHITE

CROSS-REFERENCE TO RELATED PATENT APPLICATION

This application claims the benefit of Korean Patent Applications No. 10-2014-0072934, filed on Jun. 16, 2014, and 10-2013-0091527, filed on Aug. 1, 2013, in the Korean Intellectual Property Office, the disclosure of which is incorporated herein in its entirety by reference.

BACKGROUND OF THE INVENTION

1. Field of the Invention

The present invention relates to a method of manufacturing ceramic coated graphite, wherein the ceramic coated graphite is easily and economically synthesized.

2. Description of the Related Art

Due to an increase in heating values along with rapid improvement in performance of electronic products, performance deterioration according to an increase in operating temperature and breaking of a printed circuit board according to repeated thermal expansion have become big issues. Most packages used in electronic products are polymer composites, there have been attempts to effectively discharge heat generated inside the electronic products by increasing low thermal conductivity of polymer resins worldwide.

In order to use a heat resistant polymer composite as a package of an electronic product for above purposes, the heat resistant polymer composite needs to have not only high thermal conductivity but also excellent electric insulation. Accordingly, a filler having excellent thermal conductivity and electric insulation is required, and in prior arts, the filler having excellent thermal conductivity and electric insulation is manufactured by coating graphite with ceramic having electric insulation. However, a process of reforming a surface of the graphite is required in order to uniformly coat the surface of the graphite with the ceramic. Then, a drying process is necessarily performed, and thus an overall process time is increased and processes become complicated, thereby resulting in low productivity. Accordingly, in order to continuously mass-produce ceramic coated graphite, a simpler method of manufacturing the ceramic coated graphite is required.

KR 10-0895521 discloses a carbon nanotube conductive layer using spray coating and a preparing method thereof.

A general method of manufacturing ceramic coated graphite includes: preparing a coating solution by mixing and dispersing carbon nanotubes, a dispersing agent, and a solvent; and spraying the coating solution onto a base at a pressure from 0.05 to 60 kgf/cm$^2$, and drying up the coated base, wherein the coating solution contains 0.01 to 20 parts by weight of carbon nanotubes per 100 parts by weight of the coating solution.

However, in the general method of manufacturing ceramic coated graphite, since a coated product is obtained by spraying or printing ink to coat a parent material with the ink, and then fusing the ink via sintering or drying, expenses increase and yield rates decrease due to complex processes and various management factors generated during each process.

SUMMARY OF THE INVENTION

The present invention provides a method of manufacturing graphite uniformly coated with ceramic, which has high productivity and economic feasibility by simplifying processes, and excellent thermal conductivity and electric insulation.

According to an aspect of the present invention, there is provided a method of manufacturing ceramic coated graphite having electric resistance in a range from $10^8$ to $10^{16}$ Ω/sq via a sol-gel method, the ceramic coated graphite including: graphite; and ceramic chemically bonded to a lateral defect area of the graphite.

When the graphite is coated with the ceramic, a pyrene derivative may be further added as a dispersing agent.

According to another aspect of the present invention, there is provided a method of manufacturing ceramic coated graphite, the method including: introducing 0.1 to 70 parts by weight of graphite having an average diameter from 10 nm to 1000 pm based on 100 parts by weight of an alcohol solvent and sufficiently dispersing the graphite in the alcohol solvent to obtain a dispersed solution; introducing an alkaline catalyst to the dispersed solution to titrate the dispersed solution to pH9 to pH12; and coating a surface of the graphite with ceramic by adding 10 to 300 parts by weight of a ceramic precursor for coating based on 100 parts by weight of the graphite to the dispersed solution.

The coating may further include adding a pyrene derivative as a dispersing agent.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
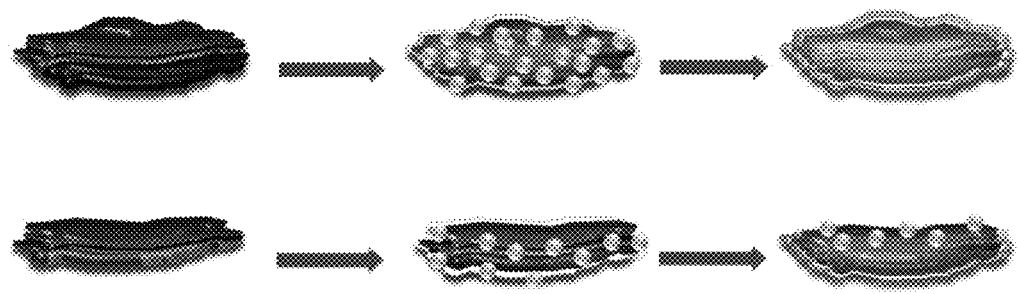
FIG. 1 is a schematic diagram illustrating a difference between graphite having a high aspect ratio and graphite having a low aspect ratio according to an embodiment of the present invention, when the graphites are coated with ceramic via a sol-gel method.

Hereinafter, the present invention will be described more fully with reference to the accompanying drawings, in which exemplary embodiments of the invention are shown.

According to an embodiment of the present invention, there is provided a method of manufacturing ceramic coated graphite having electric resistance in a range from $10^8$ to $10^{16}$ Ω/sq via a sol-gel method, the ceramic coated graphite including: graphite; and ceramic chemically bonded to a lateral defect area of the graphite, wherein the graphite is oval graphite having an aspect ratio selected from the group consisting of 10:1 to 200:1, and the ceramic is at least one type selected from the group consisting of magnesium oxide, aluminum oxide, zinc oxide, zirconium oxide, and silica. Accordingly, a process of reforming a surface of the graphite may be omitted while coating the graphite with the ceramic.

According to an embodiment of the present invention, ceramic coated graphite having electric resistance in a range from $10^8$ to $10^{16}$ Ω/sq may be manufactured via a sol-gel method, while chemically bonding a mixture of ceramic and a pyrene derivative to a lateral defect area of graphite.

According to another embodiment of the present invention, ceramic coated graphite may be manufactured by introducing 0.1 to 70 parts by weight of graphite having an average diameter from 10 nm to 1000 μm based on 100 parts by weight of an alcohol solvent and sufficiently dispersing the graphite in the alcohol solvent to obtain a dispersed solution, introducing an alkaline catalyst to the dispersed solution to titrate the dispersed solution to pH9 to pH12, and coating a surface of the graphite with ceramic by adding 10 to 300 parts by weight of a ceramic precursor for coating based on 100 parts by weight of the graphite to the dispersed solution.

Here, the graphite may be oval graphite having an aspect ratio selected from the group consisting of 10:1 to 200:1, and the ceramic may be at least one type selected from the group consisting of magnesium oxide, aluminum oxide, zinc oxide, zirconium oxide, and silica.

When the graphite is coated with the ceramic, a pyrene derivative represented by Formula 1 below may be further added as a dispersing agent.

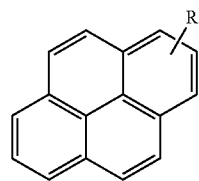

(1)

Here, R may be selected from the group consisting of carboxylic acid, $C_1$-$C_{10}$ alkylcarboxylic acid, amine, $C_1$-$C_{10}$ alkylamine, $C_1$-$C_{10}$ alkylcarboxylic halogen, $C_1$-$C_{10}$ alkylcarboxylic hydrazide, and $C_1$-$C_{10}$ alkylcarboxylic acid N-hydroxysuccinimide ester.

Also, the pyrene derivative or a salt thereof may be at least one selected from the group consisting of 1-pyrenebutyryl chloride, 1-pyrenebutyryl hydrazide, 1-pyrenemethylamine hydrochloride, 1-pyrenecarboxylic acid, 1-pyrenevaleric acid, 1-pyrenebutyric acid N-hydroxysuccinamide, γ-oxo-1-pyrenebutyric acid, and 1-pyrenebutyric acid.

According to an embodiment, the alcohol solvent may be at least one selected from the group consisting of methanol, ethanol, propanol, butanol, acetone, toluene, dimethylformamide, and xylene, and the alkaline catalyst that titrates pH may be at least one selected from the group consisting of ammonium hydroxide, tetrapropyl ammonium chloride, tetrapropyl ammonium hydroxide, potassium hydroxide, tetrabutylammonium bromide, tetrabutylammonium chloride, and tetrabutylammonium hydroxide, but the alcohol solvent and the alkaline catalyst are not limited thereto.

Also, the graphite may be 0.1 to 70 parts by weight, 5 to 50 parts by weight, or 10 to 40 parts by weight based on 100 parts by weight of ethanol, and the ceramic precursor may be 10 to 300 parts by weight, 10 to 250 parts by weight, or 15 to 300 parts by weight based on 100 parts by weight of the graphite, but the graphite and the ceramic precursor are not limited thereto.

1 to 100 parts by weight of the pyrene derivative may be added based on 100 parts by weight of the graphite.

According to another embodiment of the present invention, the ceramic precursor may be at least one selected from the group consisting of a magnesia precursor, an alumina precursor, a zinc oxide precursor, a zirconia precursor, and a silica precursor, but is not limited thereto.

The magnesia precursor may be at least one selected from the group consisting of magnesium nitrate ($Mg(NO_3)_2 \cdot 6H_2O$), magnesium acetate tetrahydrate, and magnesium methoxide, the alumina precursor may be at least one selected from the group consisting of aluminum nitrate nonahydrate, aluminum isopropoxide, and aluminum sec-butoxide, the zinc oxide precursor may be at least one of zinc nitrate and zinc acetate, the zirconia precursor may be at least one selected from the group consisting of $ZrO(NO_3)_2 \cdot H_2O$, $Zr(NO_3)_2 \cdot xH_2O$, and zirconium n-propoxide, and the silica precursor may be at least one selected from the group consisting of aminopropyltriethoxysilane (APTES), aminopropyltrimethoxysilane (APTMS), 3-mercaptopropyltriethoxysilane (MPTES), 3-mercaptopropyltrimethoxysilane (MPTMS), tetraethyl orthosilicate (TEOS), tetramethyl orthosilicate (TMOS), and tetrapropyl orthosilicate (TPOS), but are not limited thereto.

According to another embodiment of the present invention, the coating may be performed for 6 to 24 hours at a temperature from 15 to 80° C., 15 to 75° C., or 20 to 80° C.

Also, according to an embodiment of the present invention, there is provided a method of manufacturing high thermal conductive resin, the method including mixing 10 to 98 wt % of the ceramic coated graphite manufactured as above and 2 to 90 wt % of conductive resin at a temperature from a room temperature to 350° C.

In detail, 0.1 to 70 parts by weight of oval graphite having a size from 10 nm to 1000 μm and an aspect ratio from 10:1 to 200:1 based on 100 parts by weight of an alcohol solvent is introduced to and sufficiently dispersed in the alcohol solvent for 1 to 5 minutes to obtain a dispersed solution. An alkaline catalyst is introduced to the dispersed solution to titrate the dispersed solution to pH9 to pH12. Then, 10 to 300 parts by weight of a ceramic precursor for coating based on 100 parts by weight of the graphite is introduced to the dispersed solution to coat a surface of the graphite with ceramic. Here, a shape, an amount, uniformity, and a thickness of the ceramic coating the surface of the graphite may be adjusted according to conditions of the sol-gel method, and an amount and type of the ceramic precursor. Thus, thermal conductivity and electric insulation of the ceramic coated graphite obtained as such may be adjusted.

Also, 1 to 100 parts by weight of the pyrene derivative may be added as the dispersing agent based on 100 parts by weight of the graphite.

When the graphite is coated after mixing the ceramic precursor and the pyrene derivative, electric insulation of the graphite increases and the graphite is uniformly coated with the ceramic.

The present invention will be described in greater detail with reference to the following examples. The following examples are for illustrative purposes only and are not intended to limit the scope of the invention.

EXAMPLE 1

1 g of graphite (Timcal, KS6) having an aspect ratio of 200:1 and a size of 6 μm was introduced to and stirred in 100 g of ethanol for 2 minutes at a room temperature to obtain a dispersed solution, and then an ammonia aqueous solution was added to the dispersed solution to titrate the dispersed solution to pH11. Next, the dispersed solution was stirred for 12 hours after introducing 1.2 g of TEOS to the dispersed solution, and then the dispersed solution was filtered and dried to manufacture silica coated graphite.

EXAMPLE 2

10 g of graphite (Timcal, KS6) having an aspect ratio of 200:1 and a size of 6 pm was introduced to and stirred in 100 g of ethanol for 2 minutes at a room temperature to obtain a dispersed solution, and then an ammonia aqueous solution was added to the dispersed solution to titrate the dispersed solution to pH11. Next, the dispersed solution was stirred for 12 hours after introducing 12 g of TEOS to the dispersed solution, and then the dispersed solution was filtered and dried to manufacture silica coated graphite.

EXAMPLE 3

15 g of graphite (Timcal, KS6) having an aspect ratio of 200:1 and a size of 6 pm was introduced to and stirred in 100 g of ethanol for 2 minutes at a room temperature to obtain a dispersed solution, and then an ammonia aqueous solution was added to the dispersed solution to titrate the dispersed solution to pH11. Next, the dispersed solution was stirred for 12 hours after introducing 18 g of TEOS to the dispersed solution, and then the dispersed solution was filtered and dried to manufacture silica coated graphite.

Figure 2:
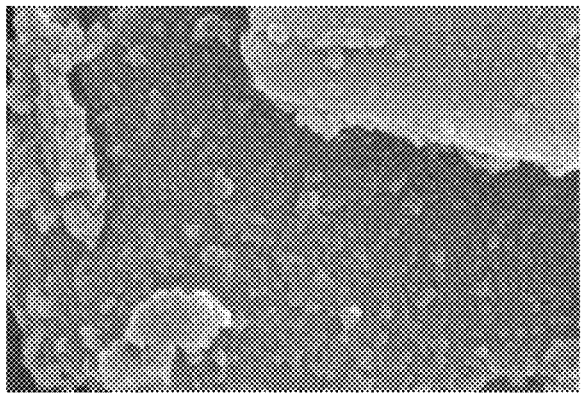
FIG. 2 is a 100,000 times enlarged scanning electron microscopic (SEM) image of a sample obtained by coating graphite having a low aspect ratio with silica ($SiO_2$)

FIG. 2 is a 100,000 times enlarged scanning electron microscopic (SEM) image of a surface of the silica coated graphite manufactured according to Example 3.

EXAMPLE 4

15 g of graphite (Timcal, KS6) having an aspect ratio of 200:1 and a size of 6 μm, and 3 g of 1-pyrenecarboxylic acid that is a pyrene derivative were introduced to and stirred in 100 g of ethanol for 2 minutes at a room temperature to obtain a dispersed solution, and then an ammonia aqueous solution was added to the dispersed solution to titrate the dispersed solution to pH11. Next, the dispersed solution was stirred for 12 hours after introducing 18 g of TEOS to the dispersed solution, and then the dispersed solution was filtered and dried to manufacture silica coated graphite.

Figure 4:
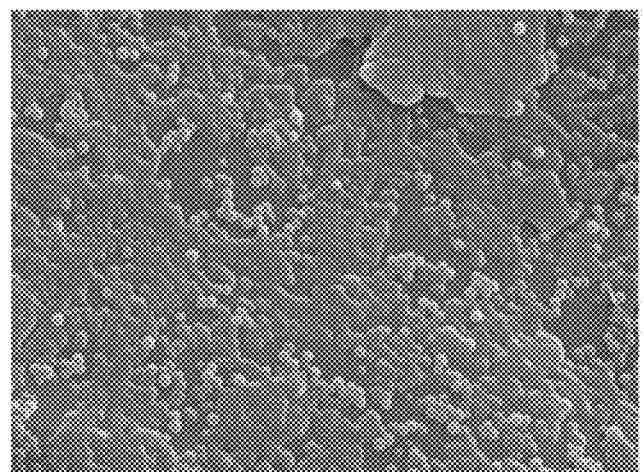
FIG. 4 is a 100,000 times enlarged SEM image of a sample obtained by coating graphite having a low aspect ratio with silica ($SiO_2$) after adding a pyrene derivative to the graphite.

FIG. 4 is a 100,000 times enlarged SEM image of a surface of the silica coated graphite manufactured according to Example 4.

EXAMPLE 5

10 g of graphite (Timcal, KS6) having an aspect ratio of 200:1 and a size of 6 μm, and 2 g of 1-pyrenecarboxylic acid that is a pyrene derivative were introduced to and stirred in 100 g of ethanol for 2 minutes at a room temperature to obtain a dispersed solution, and then an ammonia aqueous solution was added to the dispersed solution to titrate the dispersed solution to pH11. Next, the dispersed solution was stirred for 12 hours after introducing 12 g of aluminum nitrate to the dispersed solution, and then the dispersed solution was filtered and dried to manufacture alumina coated graphite.

EXAMPLE 6

10 g of graphite (Timcal, KS6) having an aspect ratio of 200:1 and a size of 6 μm, and 2 g of 1-pyrenecarboxylic acid that is a pyrene derivative were introduced to and stirred in 100 g of ethanol for 2 minutes at a room temperature to obtain a dispersed solution, and then an ammonia aqueous solution was added to the dispersed solution to titrate the dispersed solution to pH11. Next, the dispersed solution was stirred for 12 hours after introducing 12 g of zinc nitrate to the dispersed solution, and then the dispersed solution was filtered and dried to manufacture zinc oxide coated graphite.

EXAMPLE 7

10 g of graphite (Timcal, KS6) having an aspect ratio of 200:1 and a size of 6 μm, and 2 g of 1-pyrenecarboxylic acid that is a pyrene derivative were introduced to and stirred in 100 g of ethanol for 2 minutes at a room temperature to obtain a dispersed solution. Next, the dispersed solution was stirred for 12 hours after introducing 12 g of zirconium n-propoxide to the dispersed solution, and then the dispersed solution was filtered and dried to manufacture zirconium oxide coated graphite.

EXAMPLE 8

10 g of graphite (Timcal, KS6) having an aspect ratio of 200:1 and a size of 6 μm, and 2 g of 1-pyrenecarboxylic acid that is a pyrene derivative were introduced to and stirred in 100 g of ethanol for 2 minutes at a room temperature to obtain a dispersed solution, and then an ammonia aqueous solution was added to the dispersed solution to titrate the dispersed solution to pH11. Next, the dispersed solution was stirred for 12 hours after introducing 12 g of magnesium nitrate to the dispersed solution, and then the dispersed solution was filtered and dried to manufacture magnesium oxide coated graphite.

EXAMPLE 9

60 wt % of the silica coated graphite manufactured according to Example 3 as an electric insulating thermal conductive filler, and 40 wt % of high density polyethylene (HDPE) as resin were mixed at 260° C. by using an internal mixer to manufacture electric insulating high thermal conductive resin.

EXAMPLE 10

60 wt % of the silica coated graphite manufactured according to Example 4 as an electric insulating thermal conductive filler, and 40 wt % of HDPE as resin were mixed at 260° C. by using an internal mixer to manufacture electric insulating high thermal conductive resin.

EXAMPLE 11

60 wt % of the alumina coated graphite manufactured according to Example 5 as an electric insulating thermal conductive filler, and 40 wt % of HDPE as resin were mixed at 260° C. by using an internal mixer to manufacture electric insulating high thermal conductive resin.

EXAMPLE 12

60 wt % of the zinc oxide coated graphite manufactured according to Example 6 as an electric insulating thermal conductive filler, and 40 wt % of HDPE as resin were mixed at 260° C. by using an internal mixer to manufacture electric insulating high thermal conductive resin.

EXAMPLE 13

60 wt % of the zirconium oxide coated graphite manufactured according to Example 7 as an electric insulating thermal conductive filler, and 40 wt % of HDPE as resin were mixed at 260° C. by using an internal mixer to manufacture electric insulating high thermal conductive resin.

EXAMPLE 14

60 wt % of the magnesium oxide coated graphite manufactured according to Example 8 as an electric insulating thermal conductive filler, and 40 wt % of HDPE as resin were mixed at 260° C. by using an internal mixer to manufacture electric insulating high thermal conductive resin.

COMPARATIVE EXAMPLE 1

Graphite (Timcal, KS6) having an aspect ratio of 200:1 and a size of 6 μm was prepared.

COMPARATIVE EXAMPLE 2

15 g of graphite (Cheap Tubes Inc., Graphite Nanoplatelets) having an aspect ratio of 1000:1 and a size of 6 μm was introduced to and stirred in 100 g of ethanol for 2 minutes at a room temperature to obtain a dispersed solution, and then an ammonia aqueous solution was added to the dispersed solution to titrate the dispersed solution to pH11. Next, the dispersed solution was stirred for 12 hours after introducing 18 g of TEOS to the dispersed solution, and then the dispersed solution was filtered and dried to manufacture silica coated graphite.

Figure 3:
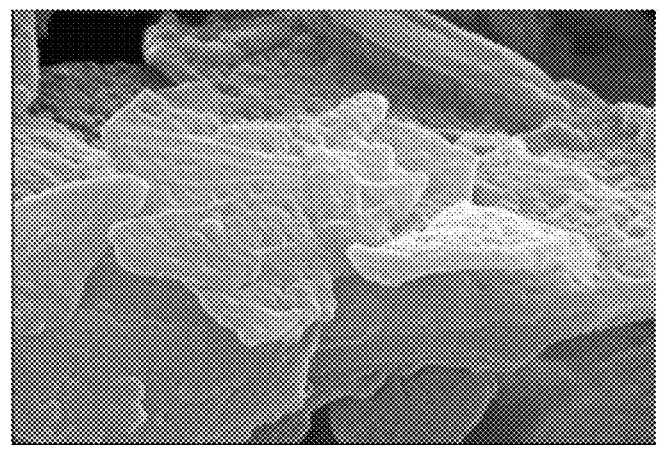
FIG. 3 is a 100,000 times enlarged SEM image of a sample obtained by coating graphite having a high aspect ratio with silica ($SiO_2$)

FIG. 3 is a 100,000 times enlarged SEM image of a surface of the silica coated graphite manufactured according to Comparative Example 2.

COMPARATIVE EXAMPLE 3

60 wt % of graphite (Timcal, KS6) having an aspect ratio of 200:1 and a size of 6 μm as an electric insulating thermal conductive filler, and 40 wt % of HDPE as resin were mixed at 260° C. by using an internal mixer to manufacture electric insulating high thermal conductive resin.

COMPARATIVE EXAMPLE 4

60 wt % of the graphite (Cheap Tubes Inc., Graphite Nanoplatelets) having an aspect ratio of 1000:1 and a size of 6 μm, which is coated with silica according to Comparative Example 2 as an electric insulating thermal conductive filler, and 40 wt % of HDPE as resin were mixed at 260° C. by using an internal mixer to manufacture electric insulating high thermal conductive resin.

COMPARATIVE EXAMPLE 5

20 g of graphite (Timcal, KS6) having an aspect ratio of 200:1 and a size of 6 μm, 20 g of sulfuric acid (98%), and 60 g of nitric acid (63%) were stirred while being heated for 24 hours at a temperature of 110° C., and then filtered and dried to manufacture graphite having an oxide-reformed surface. 15 g of the manufactured graphite was put into 100 g of ethanol at a room temperature to obtain a dispersed solution, and an ammonia aqueous solution was added to the dispersed solution to titrate the dispersed solution to pH 11. Next, the dispersed solution was stirred for 12 hours after introducing 18 g of TEOS to the dispersed solution at a room temperature under a nitrogen atmosphere, and then the dispersed solution was filtered and dried to manufacture silica coated graphite. 60 wt % of the manufactured silica coated graphite as an electric insulating thermal conductive filler, and 40 wt % of HDPE as resin were mixed at 260° C. by using an internal mixer to manufacture electric insulating high thermal conductive resin.

EXPERIMENT EXAMPLE

Property Evaluation

Surface resistances of ceramic coated graphite manufactured according to Examples 1 through 8 and Comparative Examples 1 and 2 are measured based on ASTM D 257. Also, thermal conductivities (vertical direction: $\wedge \parallel$ and horizontal direction: $\wedge \perp$) of electric insulating high thermal conductive resin compositions to which ceramic coated graphite fillers manufactured according to Examples 9 through 14 and Comparative Examples 3 through 5 are introduced are measured based on ASTM E1461. The measured surface resistances are shown in Table 1 below with compositions, and results of measuring thermal conductivities and surface resistances of polymer composites to which the ceramic coated graphite of Table 1 are introduced are shown in Table 2 below with compositions.

TABLE 1

| | Type of Ceramic | Graphite having Low Aspect Ratio (wt %) | Graphite having High Aspect Ratio (wt %) | Precursor (wt %) | Pyrene Derivative (wt %) | H | Surface Resistance (Ω/sq) |
|---|---|---|---|---|---|---|---|
| Example 1 | Silica | 1 | — | 120 | — | 1 | $1.1 \times 10^{10}$ |
| Example 2 | Silica | 10 | — | 120 | — | 1 | $1.2 \times 10^{10}$ |
| Example 3 | Silica | 15 | — | 120 | — | 1 | $1.0 \times 10^{10}$ |
| Example 4 | Silica | 15 | — | 120 | 20 | 1 | $5.0 \times 10^{13}$ |
| Example 5 | Alumina | 10 | — | 120 | — | 1 | $2.4 \times 10^{13}$ |
| Example 6 | Zinc Oxide | 10 | — | 120 | — | 1 | $3.8 \times 10^{13}$ |
| Example 7 | Zirconium Oxide | 10 | — | 120 | — | 1 | $7.4 \times 10^{13}$ |
| Example 8 | Magnesium Oxide | 10 | — | 120 | — | 1 | $5.7 \times 10^{13}$ |
| Comparative Example 1 | — | — | — | — | — | — | 40 |
| Comparative Example 2 | Silica | | 15 | 120 | — | 1 | $3.7 \times 10^{7}$ |

TABLE 2

| | Filler (wt %) | HDPE (wt %) | Thermal Conductivity ($\Lambda_\parallel$, W/mK) | Thermal Conductivity ($\Lambda_\perp$, W/mK) | Surface Resistance ($\Omega$/sq) |
|---|---|---|---|---|---|
| Example 9 | Silica-Graphite having Low Aspect Ratio (60) | 40 | 6.9 | 1.9 | $5.6 \times 10^{12}$ |
| Example 10 | Silica-Graphite having Low Aspect Ratio (60) | 40 | 7.1 | 2.0 | $7.9 \times 10^{14}$ |
| Example 11 | Alumina-Graphite having Low Aspect Ratio (60) | 40 | 7.5 | 2.5 | $6.4 \times 10^{14}$ |
| Example 12 | Zinc Oxide-Graphite having Low Aspect Ratio (60) | 40 | 7.6 | 2.5 | $2.7 \times 10^{14}$ |
| Example 13 | Zirconium Oxide-Graphite having Low Aspect Ratio (60) | 40 | 7.3 | 2.1 | $1.8 \times 10^{14}$ |
| Example 14 | Magnesium Oxide-Graphite having Low Aspect Ratio (60) | 40 | 7.6 | 2.2 | $3.6 \times 10^{14}$ |
| Comparative Example 3 | Graphite having Low Aspect Ratio (60) | 40 | 8.7 | 3.4 | $5.9 \times 10^{0}$ |
| Comparative Example 4 | Silica-Graphite having High Aspect Ratio (60) | 40 | 8.1 | 3.0 | $1.4 \times 10^{8}$ |
| Comparative Example 5 | Silica manufactured by introducing graphite reforming process-Graphite having Low Aspect Ratio (60) | 40 | 4.3 | 1.2 | $2.3 \times 10^{13}$ |

In Table 1 above, an amount of graphite is in wt % with respect to ethanol, an amount of a precursor is in wt % with respect to graphite added during sol-gel synthesis, and an amount of a pyrene derivative is in wt % with respect to graphite.

As shown in Table 1, comparing Examples 1 through 8 with Comparative Example 1, it may be determined that a value of a surface resistance of a sample obtained by coating graphite having a low aspect ratio with ceramic without a separate surface reforming process indicates insulation.

Comparing the surface resistances of Examples 3 and 4 with Comparative Example 2, a value of a surface resistance is about 270 times higher when graphite having a low aspect ratio is used as a base of silica coating than when graphite having a high aspect ratio is used as a base of silica coating. As such, surfaces of the graphite having a low aspect ratio according to Examples 1 through 3 are uniformly coated with silica, and thus show excellent electric insulating effect.

On the other hand, a surface of the graphite having a high aspect ratio according to Comparative Example 2 is relatively un-uniformly coated with silica, and thus the surface resistance is low. Thus, when graphite having a low aspect ratio, according to an embodiment of the present invention, is used as a base of ceramic coating, a surface of the graphite is uniformly coated with ceramic without having to perform a reforming process and has excellent electric insulation.

Meanwhile, a value of the surface resistance is about 5000 times higher when a mixture of the ceramic precursor and the pyrene derivative is used for coating as in Example 4 than when a pyrene derivative is not used as in Example 3. In a pyrene derivative, a pyrene group having four benzene rings is satisfactorily adhered to a surface of graphite, thereby aiding the graphite to be satisfactorily dispersed in a solution. Since a pyrene derivative has a functional group having high electronegativity at a terminal thereof, the pyrene derivative is highly compatible with TEOS that is a silica precursor, and thus when the TEOS is mixed with a pyrene-based material for coating, surface of graphite is uniformly coated with silica.

FIG. 4 is an SEM image of a sample obtained by mixing ceramic and a pyrene derivative and coating graphite with the mixture, according to an embodiment of the present invention, and as shown in FIG. 4, a surface of the graphite is uniformly coated with silica when the pyrene derivative is used.

Referring to Examples 5 through 8, even when ceramic coating is performed on graphite having an aspect ratio by using alumina, zinc oxide, zirconium oxide, and magnesium oxide, without a separate surface reforming process, the ceramic coated graphite has excellent electric insulation as in Examples 1 through 4.

Referring to Table 2, comparing Examples 9 through 14 with a HDPE composite to which the graphite of Comparative Example 3 is introduced, surface resistances of HDPE composites to which the graphite manufactured according to Examples 3 through 8 are introduced are all equal to or higher than $10^{12}$ $\Omega$/sq, and thus are electrically insulating.

Comparing Example 9 and Comparative Example 4, the value of the surface resistance of an HDPE composite to which a sample obtained by coating graphite having a low aspect ratio with silica is introduced is far superior to that of an HDPE composite to which a sample obtained by coating graphite having a high aspect ratio with silica is introduced. Here, since the surfaces of the graphite having a low aspect ratio are uniformly and strongly coated with ceramic as in Examples 1 through 8 of Table 1, ceramic coating structures do not break and insulation is maintained even at high shears generated while mixing the samples of Examples 1 through 8 and the HDPE at 270° C. in the internal mixers, whereas in Comparative Example 4, the HDPE that has insulation is mixed but since the surface of graphite is not uniformly coated, a ceramic coating structure breaks during the mixing process and a contact area between the graphite and the ceramic increases, and thus electricity is relatively easily conducted. However, according to one or more embodiments of the present invention, thermal conductivity and electric insulation, which are original properties, are satisfactorily maintained when graphite having a low aspect ratio is coated with ceramic that is mixed with polymer, even if a process of reforming a surface of the graphite is not performed.

Comparing Examples 9 and 10, if amounts of HDPE composites are the same, electric insulation of the HDPE composite of Example 10 using graphite coated with silica by using a pyrene derivative is higher by about 140 times than that of the HDPE composite of Example 9, because as compared in FIGS. 3 and 4, when a pyrene derivative is used, graphite is further uniformly coated with ceramic and a surface of the graphite is smooth, and thus insulation of the ceramic coated graphite remarkably increases.

Electric insulation of ceramic coated graphite manufactured according to Comparative Example 5 using a process of reforming a surface of graphite is somewhat higher than that of ceramic coated graphite manufactured according to Example 9, because since crystalline of graphite breaks while a surface of the graphite is processed via a general surface oxidation reaction of a carbon material, electric conductivity is decreased, and as a result, insulation is slightly increased. If the crystalline of the graphite breaks, thermal conductivity is remarkably decreased. Thus, considering economic feasibility and convenient production obtained by simple processes resulting from skipping a process of reforming a surface of graphite, a method of manufacturing ceramic coated graphite, according to one or more embodiments of the present invention, is much superior to prior arts.

According to one or more embodiments of the present invention, a process of reforming a surface of graphite may be skipped when graphite having a low aspect ratio is used as a base, and thus productivity and economic efficiency are increased according to simplified processes. Also, electric insulation may be remarkably increased by uniformly dispersing ceramic after adding a pyrene derivative to the ceramic.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing ceramic coated graphite, the method comprising:
    introducing 0.1 to 70 parts by weight of graphite having an average diameter from 10 nm to 1000 µm based on 100 parts by weight of an alcohol solvent and sufficiently dispersing the graphite in the alcohol solvent to obtain a dispersed solution;
    introducing an alkaline catalyst to the dispersed solution to titrate the dispersed solution to pH9 to pH12; and
    coating a surface of the graphite with ceramic by adding 10 to 300 parts by weight of a ceramic precursor and 1 to 100 parts by weight of a pyrene derivative or a salt thereof selected from the group of consisting of 1-pyrenebutyryl chloride, 1-pyrenebutyryl hydrazide, 1-pyrenevaleric acid and 1-pyrenebutyric acid N-hydroxysuccinamide for coating based on 100 parts by weight of the graphite to the dispersed solution,
    wherein the graphite is oval graphite having an aspect ratio selected from the group consisting of 10:1 to 200:1,
    wherein the ceramic is at least one type selected from the group consisting of magnesium oxide, aluminum oxide, zinc oxide, zirconium oxide, and silica.

2. The method of claim 1, wherein the alcohol solvent is at least one selected from the group consisting of methanol, ethanol, propanol, and butanol.

3. The method of claim 1, wherein the alkaline catalyst is at least one selected from the group consisting of ammonium hydroxide, tetrapropyl ammonium chloride, tetrapropyl ammonium hydroxide, potassium hydroxide, tetrabutylammonium bromide, tetrabutylammonium chloride, and tetrabutylammonium hydroxide.

4. The method of claim 1, wherein the ceramic precursor is at least one selected from the group consisting of a magnesia precursor, an alumina precursor, a zinc oxide precursor, a zirconia precursor, and a silica precursor,
    wherein the magnesia precursor is at least one selected from the group consisting of magnesium nitrate ($Mg(NO_3)_2 \cdot 6H_2O$), magnesium acetate tetrahydrate, and magnesium methoxide,
    the alumina precursor is at least one selected from the group consisting of aluminum nitrate nonahydrate, aluminum isopropoxide, and aluminum sec-butoxide,
    the zinc oxide precursor is at least one of zinc nitrate and zinc acetate,
    the zirconia precursor is at least one selected from the group consisting of $ZrO(NO_3)_2 \cdot H_2O$, $Zr(NO_3)_2 \cdot xH_2O$, and zirconium n-propoxide, and
    the silica precursor is at least one selected from the group consisting of aminopropyltriethoxysilane (APTES), aminopropyltrimethoxysilane (APTMS), 3-mercaptopropyltriethoxysilane (MPTES), 3-mercaptopropyltrimethoxysilane (MPTMS), tetraethyl orthosilicate (TEOS), tetramethyl orthosilicate (TMOS), and tetrapropyl orthosilicate (TPOS).

5. The method of claim 1, wherein the coating is performed for 6 to 24 hours at a temperature from 15 to 80° C.

6. A method of manufacturing ceramic coated graphite, the method comprising:
    introducing 0.1 to 70 parts by weight of graphite having an average diameter from 10 nm to 1000 µm based on 100 parts by weight of an alcohol solvent and sufficiently dispersing the graphite in the alcohol solvent to obtain a dispersed solution;
    introducing an alkaline catalyst to the dispersed solution to titrate the dispersed solution to pH9 to pH12; and
    coating a surface of the graphite with ceramic by adding 10 to 300 parts by weight of a ceramic precursor and 1 to 100 parts by weight of a pyrene derivative or a salt thereof for coating based on 100 parts by weight of the graphite to the dispersed solution, wherein the pyrene derivative or the salt thereof is 1-pyrenebutyryl chloride,
    wherein the graphite is oval graphite having an aspect ratio selected from the group consisting of 10:1 to 200:1,
    wherein the ceramic is at least one type selected from the group consisting of magnesium oxide, aluminum oxide, zinc oxide, zirconium oxide, and silica.

* * * * *